United States Patent [19]

Winner

[11] 3,933,411
[45] Jan. 20, 1976

[54] HYDROPHILIC CONTACT LENS WITH EMBEDDED STABILIZING MEANS

[76] Inventor: Albert E. Winner, 67 E. Madison St., Chicago, Ill. 60603

[22] Filed: July 23, 1971

[21] Appl. No.: 165,662

[52] U.S. Cl............................. 351/160; 351/160 X
[51] Int. Cl.²........................................ G02C 7/04
[58] Field of Search............................... 351/160

[56] References Cited
UNITED STATES PATENTS

| 2,664,025 | 12/1953 | Herman | 351/160 X |
| 3,468,602 | 9/1969 | Rosen | 351/160 |
| 3,497,577 | 2/1970 | Wichterle | 351/160 X |
| 3,503,942 | 3/1970 | Seiderman | 351/160 X |
| 3,698,802 | 10/1972 | Baron | 351/160 |

FOREIGN PATENTS OR APPLICATIONS

| 1,563,496 | 3/1969 | France | 351/160 |

Primary Examiner—David H. Rubin
Attorney, Agent, or Firm—Hume, Clement, Brinks, Willian, Olds & Cook, Ltd.

[57] ABSTRACT

A contact lens wherein the body of the lens is made of soft plastic with a stabilized optical area in the lens, stabilization of the optical area being realized with the addition of stabilizing means at or slightly radially outwardly disposed with respect to the approximate maximum pupil opening of the eye.

4 Claims, 13 Drawing Figures

Inventor
Albert E. Winner
By Keith J. Kulie
Attorney

FIG. 6
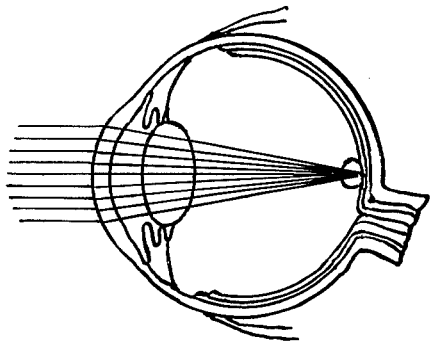
FIG. 7
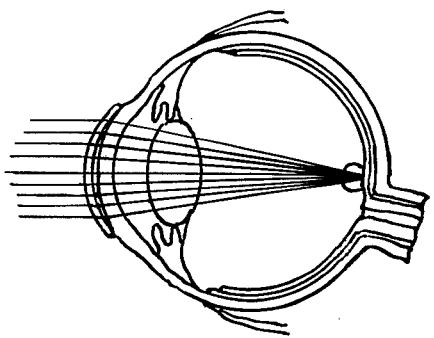
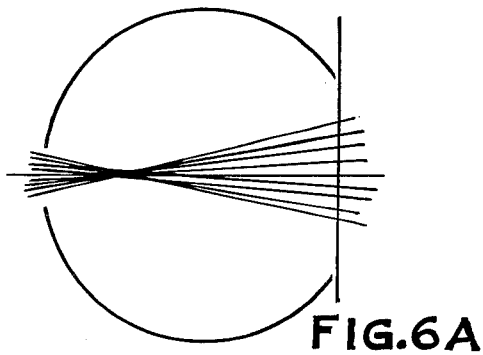
FIG.6A
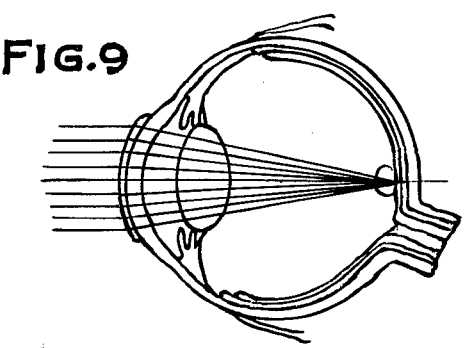
FIG.7A
FIG.8
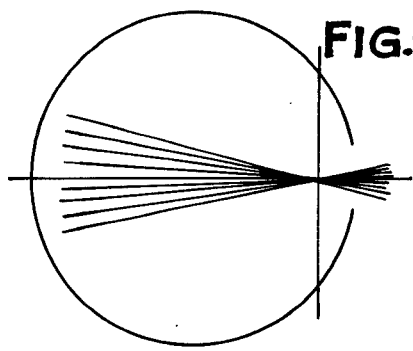
FIG.9
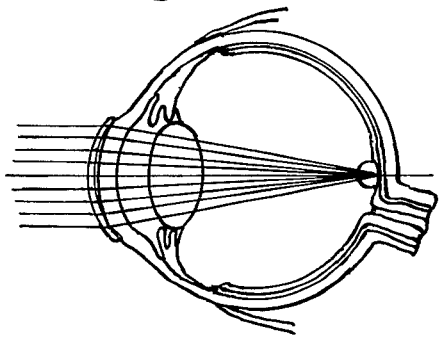
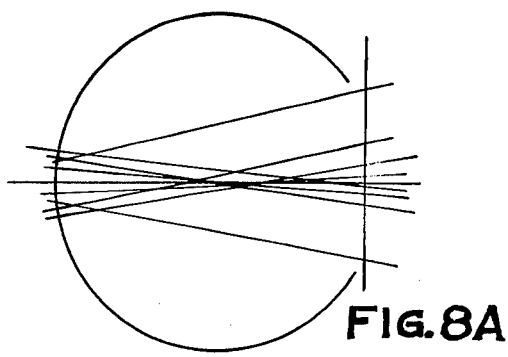
FIG.8A
FIG.9A
Inventor
Albert E. Winner
By Keith J. Kulie
Attorney

HYDROPHILIC CONTACT LENS WITH EMBEDDED STABILIZING MEANS

The present invention relates to an improved contact lens and more particularly to an improved "soft" lens having a stabilized optical area.

Recent developments have been made in materials for use in the manufacture of contact lenses. These developments involve the use of resins or plastic materials having hydrophilic characteristics, for example such as set forth in U.S. Pat. No. 2,976,576 to Wichterle et al. or U.S. Pat. No. 3,503,942 issued to Seiderman.

The use of materials as noted above in the manufacture of contact lens has been noted to be desirable in that the lens will be more adaptable to the eye and is indicated to be more comfortable when placed on the cornea and in use. Such lenses, however, do have a characteristic of attaching themselves very closely to the epithelium of the cornea and in this manner the lens is caused to adjust to the particular configuration of the cornea. It can readily be seen that if an individual is afflicted with a significant degree of astigmatism the lens will adapt to a non-spherical shape which may result in distortion of the optical area of the lens.

It should be noted that the optical area of a contact lens generally is defined in the central portion of the lens and extends across an arc of approximately 5 mm. equally spaced about the central axis of the lens. This dimension is recognized to be approximately equal, or slightly smaller than the maximum diameter of the pupil of the eye. The lens area extending outwardly of the optical portion is not used for correcting vision. It is employed on corneal contact lenses primarily to provide a supporting and area contacting surface for the lens to hold the lens on the eye and to support it in the proper position with regard to the pupil of the eye. However, this portion of the lens contributes significantly to problems for the user in that the eyelid moves over the periphery of the lens and may cause an uncomfortable sensation. The soft lens in addition to being a more adaptable to the eye contour and surface, is indicated to reduce the discomfort characteristic in that the lens surface is not dry and tears or lacrimal fluid are provided as a lubricant to ease the passage of the eyelid over the outer surface of the corneal lens. This significantly reduces the lid sensation which previously gave rise to some problems.

The characteristic of soft lenses, however, is that they will adapt to the configuration of the cornea on which they are used. Generally, an individual with a vision deficiency has astigmatism as well as other visual defects. Astigmatism, as is well known, is a spherical abberation in the cornea. When the lens adapt itself to this spherical aberration the optical area thereof may be distorted and the visual deficiency will not be corrected as desired.

The present invention contemplates the provision of auxiliary means in combination with a soft plastic lens which will provide for stabilization of the optical area of the lens so that it will not be distorted when the remaining portion of the lens adapts itself to any spherical aberration of the cornea on which it is deposited. This will assure a continuing correction of any visual defficiency originally adjusted with the lens and will still secure to the user the advantages of the soft plastic which is indicated to be desirable.

It is, accordingly, a general object of the present invention to provide an improved soft plastic lens with a stabilized optical area.

Other objects and advantages of the present invention reside in the provision of an improved soft plastic corneal lens having a stabilized optical area which is easy to manufacture, readily adapted to present modes of manufacturing, which is easy to use and which is durable in use.

The novel features which are believed to be characteristic of the present invention are set forth with particularity in the appended claims. The invention itself, however, together with further objects and advantages thereof will best be understood by reference to the following description taken in connection with the accompanying drawings, in which:

FIG. 6 is a side section view of a one-diopter myopic producing perfect point imagery, with FIG. 6A being a magnification of the area adjacent to the retina of the eye showing dispersion of the bundle of light rays;

FIG. 7 is a view of the eye of FIG. 6 after correction using a contact lens having a spherical anterior and posterior surface, with FIG. 7A illustrating the dispersion of the light rays utilizing a lens of this configuration;

Figure 1:
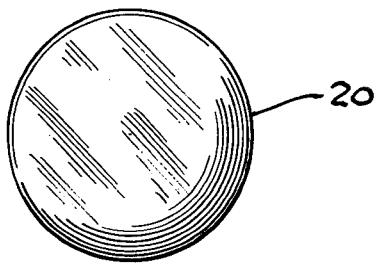
FIG. 1 is a front view of a conventional corneal lens.

FIG. 8 is another representation of the eye of FIG. 6 with vision being corrected by using a contact lens having a spherical anterior and aspheric posterior surfaces, with FIG. 8A showing significant dispersion of the light rays with a lens of this characteristic; and FIG. 9 is still another view of the eye of FIG. 1 with vision defects corrected using a contact lens having aspheric anterior and posterior surfaces, with FIG. 9A showing no spherical aberration and good focusing of the bundle of light rays at the image point.

Referring more particularly now to the drawings a contact lens of the type commonly known in the art is illustrated in FIG. 1 of the drawings. This lens is of the type adapted to fit on the cornea of the eye and may be ground to a configuration which will permit bending of light rays as they pass therethrough to correct for visual deficiencies of the user.

Different forms of corneal contact lens have been devised over the years. Some such lens involve a configuration wherein the outer periphery of the lens rests upon the cornea with the central portion being maintained in space relation to the cornea with a tear layer interposed between the posterior surface of the lens and the cornea. Other design concepts involve lens which rest only on the central protion of the cornea or lens which attempt to rest wholly upon the cornea during use.

The recent development of soft plastics, as noted above, has given rise to the provision of means to overcome one of the more common objections to users of contact lens. That is, it frequently is noted by users of these devices that an uncomfortable lid sensation will develop due to passage of the eye lid over the un-wetted outer surface of the contact lens. The lid surface is very sensitive to foreign articles on the surface of the eye and is useful in the process of eliminating these objects in combination with tears produced by the ducts.

The soft plastics employed in manufacture of contact lens have hydrophilic characteristics which permit the surface to be readily wetted by the natural fluids in the eye. Accordingly, the lid sensation is significantly reduced in that the lid will pass over the lens which is lubricated by the natural fluids in the eye.

One of the strong objections to the use of soft plastics, as they are commonly known, is that they readily adapt to the overall configuration of the cornea. Since most people with visual defects have, among other problems, astigmatism it can readily be seen that the cornea frequently does not define a portion of a perfect sphere. Accordingly, when the soft lens changes its shape to adapt itself to adapt to the particular surface configuration of the cornea on which it is placed the optical area of the lens must also change in accordance with the overall change in configuration of the lens itself. It can readily be seen that the optical characteristics of the lens may be modified by this action to an extent where the original correction is no longer available to the user and visual deficiencies again exist. It should be noted also that the shape of the cornea changes during the course of each day so that the shape of the optical area of the corneal contact lens would change in accordance with the change and shape of the cornea. With this condition, the visual correction with the use of the lens would be altered during the course of the day and no predictable correction could be obtained for any period of wear during the day.

The present invention contemplates correction of the limitation of use of soft plastics so that the optical area of such lenses will be stabilized and will not change in accordance with changes in orientation of portions of the soft lens.

Figure 2:
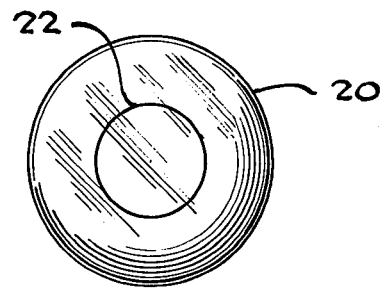
FIG. 2 is a view similar to FIG. 1 with means embedded within the lens to stabilize the optical area of a soft corneal lens.

The lens 20 of FIG. 1 is, accordingly, provided with stabilizing means 22 as illustrated in FIG. 2 of the drawings. The stabilizing means 22 may be provided in different ways. For example, the schematic illustration of FIG. 2 contemplates the provision of a rigid wire ring 22 embedded within the body of the lens 20. The ring 22 will be positioned within the lens about a radial dimension extending at or slightly beyond the maximum pupil opening generally anticipated by users. Accordingly, the optical area of the lens will be defined within the ring 22.

It has been found that the provision of a rigid element such as the ring 22 extending about the optical area of the lens 20 will define means for stabilizing the area within the ring so that is does not distort during reorientation of the soft plastic body of the lens 20. Accordingly, the advantages of the use of soft plastic may be realized without the disadvantages of the heretofore unstable optical area associated with said soft plastic lenses. The wetting characteristics of such materials may be employed to advantage without impairment of the optical area of the lenses. It should be noted also that the portion of the lens 20 extending radially outwardly from ring 22 may still adapt to particular configurations of the cornea without significantly modifying the optical area defined within the ring 22 so that the optical area is fully stabilized during periods of wear.

Figure 3:
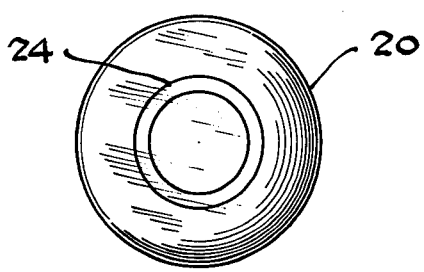
FIG. 3 is a view similar to FIG. 1 illustrating another mode of stabilizing the optical area by insertion of a transparent ring of material about the periphery of the optical area.

A modification of the means of FIG. 2 is schematically illustrated in FIG. 3 where a transparent, relatively rigid ring 24 is embedded within the soft plastic body of the lens 20. The ring 24 again is positioned in the lens 20 to that the inner periphery thereof extends at or beyond the maximum pupil opening of the user and for this reason it will not interfere with the vision of the user.

Figure 4:
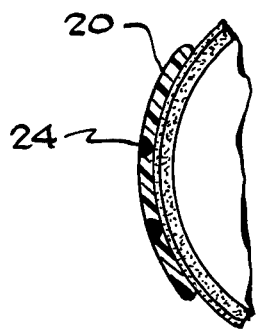
FIG. 4 is a side view of the lens of FIG. 3.

The lens of FIG. 3 is schematically illustrated in cross-section in FIG. 4 with the transparent ring 24 shown extending about the optical area of the lens and embedded wholly within the body of the lens 20.

Figure 5:
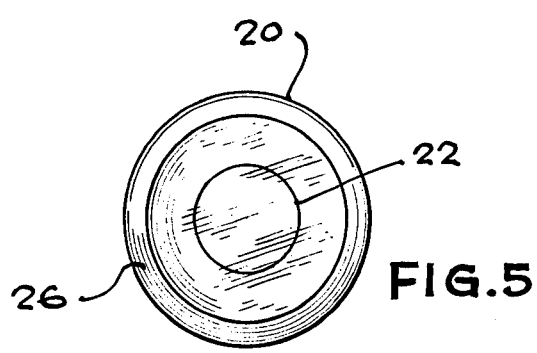
FIG. 5 is a rear view of the lens of FIG. 2.

FIG. 5 is a view of the posterior surface of the lens of FIG. 2 illustrating the wire stabilizing means embedded within the body of the lens 20 and further illustrating a slight beveled surface 26 on the posterior surface of the lens as seen also in the section view of FIG. 4 of the drawings.

Contact lenses are commonly made by grinding and polishing segments of a spherical surface on the anterior and posterior surfaces of the lenses. Correction for visual defects made be provided by defining a spherical surface with a different radius on the opposing lens surface so that light rays are bent as they pass through the lens to functionally cooperate with the lacrimal fluid, cornea and lens of the eye to approximate or achieve normal vision, or what the user will interpret and accept as normal vision.

One of the problems with the provision and development of contact lenses is that the corneal surface does not correspond to a segment of a true sphere. It is irregularly shaped and more closely defines an ellipsoidal curve with characteristic flattening toward the peripheral areas of the cornea. Accordingly, visual defects are difficult, if not impossible, to correct completely upon combining the refractive characteristics of a spherical surface with an ellipsoidal surface as represented by the cornea. This condition is further impaired when we realize that most visual defects are accompanied by a degree of astigmatism. This results in aberration of the ellipsoidal surface of the cornea to the extent that a different radius of curvature will be defined depending upon the arc selected to measure said radius of curvature.

The above problems are made even more difficult when a soft plastic lens is used for the correction of vision and the lens begins to adapt itself to a particular configuration of the surface of the cornea. The illustrations of FIGS. 6–9 graphically set forth the results of a computer ray tracing analysis and demonstrate the characteristics of a visual deficiency and the functional effect of corneal contact lens used in combination with the eye.

FIG. 6 is a schematic illustration of a human eye with a myopic deficiency of about 1.0 diopter. Functional light transmitting surfaces have been assumed to be spherical expect for the anterior surfaces of the cornea and lens. The anterior surface of the cornea was assumed to be ellipsoidal with a vertex radius of 7.50 mm with the cornea flattening peripherally outwardly so that at a distance of about 4.5 mm from the central axis. Meridional radius of curvature is about 7.94mm.

The anterior surface of the lens was assumed to be aspheric. For computer analysis all terms of the corneal and lens surfaces and the conic constant of the light refracting means were adjusted until all spherical aberration was removed from the axial image point. This is graphically illustrated in FIG. 6A. It is to be noted that the point focus of the light rays of FIGS. 6 and 6A is displaced from the retina by an amount equivalent to a diopter of myopia.

It can readily be seen that the light rays have begun to diverge as they strike the retina (FIGS. 6–6A) and for this reason present an image that is not in sharp focus. It is necessary to have the point focus at the retina for a clearly defined image that is properly in focus.

In the schematic illustration of FIG. 7 a minus 1 diopter contact lens has been placed on the cornea to correct the visual deficiency of the eye of FIG. 6. The contact lens is of the type having spherically ground anterior and posterior surfaces. The anterior surface was ground to a radius of 7.62 mm while the posterior surface was ground to a 7.50 mm radius. The thickness of the fluid separating the lens from the cornea is assumed to be 0.015 mm. This results, of course, in an apical clearance between the cornea and the lens to define an "edge touch" of the lens with the cornea at a zone 8.5 mm in diameter. FIG. 7A illustrates that significant spherical aberration has been introduced and visual acuity is not enhanced by use of the contact lens, especially at large pupil openings. The maximum bundle of rays is represented at a 9 mm diameter pupil opening. However, even at a pupil opening of 2 mm the circle of least image confusion is displaced from the retina by an amount corresponding to approximately +0.2 diopters.

The schematic illustration of FIG. 8 shows the effect produced by a lens similar to the one of FIG. 7, except that the posterior surface has the same ellipsoidal form as the anterior of the cornea. A tear layer of 0.004 mm is assumed to separate posterior surface of the lens and the exterior surface of the cornea. The pattern of spherical aberration — that is, the dispersion of the ray bundle — illustrated in FIG. 8A is observed to be worse than the illustration set forth in FIG. 7A. It may be concluded from this that an aspheric posterior although desirable from the fitting standpoint, cannot be expected to yield better vision than a spherical posterior lens surface, if both are used with spherical anterior surfaces.

The schematic illustration of FIG. 9 represents a different accommodation of a contact lens to an eye. The illustration sets forth an indication of what an aspheric anterior surface may accomplish. When properly designed, it is apparent that no spherical aberration need be introduced; that is, perfect images may be maintained. The posterior surface lens may be either spherical or, for a better fit if desired, aspherical. Either a spherical or aspherical posterior lens surface will result in nearly the same degree of image perfection.

It is to be noted in the above illustration that each of the representations contemplates a stabilized optical area in the contact lens as distinguished from an unstable area which could give rise to defraction of light rays in a different manner than that originally contemplated when the lens was produced to correct the particular visual dificiency of the user. It should be noted, however, from the schematic illustrations set forth in FIGS. 6–9 that it may be desirable to provide a lens in which the posterior surface will adapt to the exterior surface of the cornea. That is, the aberration introduced by change in the posterior surface of the lens does not have as significant an effect on vision of the user as an aberration on the anterior surface of the lens.

The present invention, accordingly, provides means for stabilizing the optical area of the lens and particularly for stabilizing the anterior portion of the lens so that the correction originally provided in the lens will not be affected when the lens adapts itself to the surface contour of the cornea of the user.

While a specific embodiment of the present invention has been shown and described it will, of course, be understood that other modifications and alternative configuration may be used without departing from the ture spirit and scope of this invention. It therefore is intended by the appended claims to cover all such modifications and alternative constructions as fall within their true spirit and scope.

What is claimed and intended to be secured by Letters Patent of the United States, is:

1. An improved contact lens made of hydrophilic plastic material which is adapted generally to orient itself in a manner corresponding with the eye contour and surface on which it rests, the improvement comprising:

a contact lens body having a central optical area corresponding generally to the maximum pupil opening of the eye and an outer peripheral area in surrounding relationship with said optical area;

means embedded wholly within said lens body and positioned radially beyond said central optical area for stabilizing the anterior portion of said central optical area against re-orientation in a manner corresponding to the eye contour, whereby the optical characteristics originally provided in said optical area is retained during re-orientation of the lens body; and an inwardly beveled surface on the posterior outermost radial edge of said peripheral area.

2. The lens of claim 1 wherein the stabilizing means is disposed radially outwardly of the maximum pupil opening of the user.

3. The lens of claim 1 wherein the stabilizing means is a rigid 5 gauge wire ring.

4. The lens of claim 1 wherein the stabilizing means is a rigid transparent ring.

* * * * *